US012800188B1

(12) United States Patent
Brache

(10) Patent No.: US 12,800,188 B1
(45) Date of Patent: Nov. 17, 2026

(54) ELECTRIC COMPACT COMPOSITE WATER HEATER AND BOOSTER

(71) Applicant: Humberto Brache, Santa Clarita, CA (US)

(72) Inventor: Humberto Brache, Santa Clarita, CA (US)

( * ) Notice: Subject to any disclaimer, the term of this patent is extended or adjusted under 35 U.S.C. 154(b) by 1304 days.

(21) Appl. No.: 17/473,951

(22) Filed: Sep. 13, 2021

Related U.S. Application Data

(63) Continuation-in-part of application No. 16/051,357, filed on Jul. 31, 2018, now abandoned.

(60) Provisional application No. 63/243,142, filed on Sep. 11, 2021, provisional application No. 62/605,048, filed on Jul. 31, 2017.

(51) Int. Cl.

| | |
|---|---|
| ***F24H 1/18*** | (2022.01) |
| ***B67D 1/00*** | (2006.01) |
| ***B67D 1/08*** | (2006.01) |
| ***F24D 17/00*** | (2022.01) |
| ***F24H 1/20*** | (2022.01) |
| ***F24H 9/1818*** | (2022.01) |
| ***F24H 9/20*** | (2022.01) |
| ***F24H 15/174*** | (2022.01) |
| ***F24H 15/223*** | (2022.01) |
| *F24H 15/156* | (2022.01) |

(52) U.S. Cl.
CPC ........... *F24H 1/185* (2013.01); *B67D 1/0014* (2013.01); *B67D 1/0895* (2013.01); *F24D 17/0031* (2013.01); *F24D 17/0089* (2013.01); *F24H 1/181* (2013.01); *F24H 1/202* (2013.01); *F24H 9/1818* (2013.01); *F24H 15/174* (2022.01); *F24H 15/223* (2022.01); *F24H 9/2014* (2013.01); *F24H 15/156* (2022.01)

(58) Field of Classification Search
CPC .......... F24H 1/185; F24H 1/181; F24H 1/202; F24H 9/1818; F24H 15/174; F24H 15/223; F24H 9/2014; F24H 15/156; F24D 17/0031; F24D 17/0089; B67D 1/0014; B67D 1/0895
See application file for complete search history.

(56) References Cited

U.S. PATENT DOCUMENTS

| | | | | |
|---|---|---|---|---|
| 4,257,355 A | | 3/1981 | Cook | |
| 4,330,309 A | | 5/1982 | Robinson | |
| 4,602,145 A | * | 7/1986 | Roberts | A47J 31/56<br>99/305 |

(Continued)

FOREIGN PATENT DOCUMENTS

| | | | | |
|---|---|---|---|---|
| CN | 201772631 U | * | 3/2011 | |
| CN | 111306355 A | * | 6/2020 | F16K 11/06 |

OTHER PUBLICATIONS

Machine English Translation of CN-201772631-U (Year: 2011).*

(Continued)

*Primary Examiner* — Erwin J Wunderlich
(74) *Attorney, Agent, or Firm* — Law Office of David Hong

(57) ABSTRACT

An apparatus for heating water employing a pressurized composite water tank comprises an integral channel or groove for mounting wires; a water outlet fitting with a stop flange portion, multiple O-ring grooves and multiple matching O-rings; at least one temperature sensing device (a thermistor sensor with a stainless-steel probe; separate thermostat); and a water level sensing device.

16 Claims, 7 Drawing Sheets

(56) References Cited

U.S. PATENT DOCUMENTS

| | | | | | |
|---|---|---|---|---|---|
| 5,009,572 | A * | 4/1991 | Imhoff | F24D 17/00 | 122/13.3 |
| 5,191,634 | A * | 3/1993 | Couch | H05B 3/82 | 392/501 |
| 5,553,935 | A * | 9/1996 | Burnham | B67D 3/00 | 312/265.5 |
| 5,647,269 | A * | 7/1997 | Miller | A47J 31/605 | 99/279 |
| 6,137,955 | A * | 10/2000 | Krell | F24H 15/414 | 392/455 |
| 9,688,407 | B2 | 6/2017 | Mcintosh | | |
| 10,443,859 | B2 * | 10/2019 | Boivin | F24H 15/37 | |
| 10,760,853 | B1 * | 9/2020 | Chandler | F28D 1/0206 | |
| 10,837,676 | B2 * | 11/2020 | Boros | F24H 9/2021 | |
| 10,875,649 | B2 | 12/2020 | Brown | | |
| 11,148,928 | B1 * | 10/2021 | Huang | F24H 1/188 | |
| 2003/0012564 | A1 * | 1/2003 | Brache | F24H 1/181 | 219/518 |
| 2007/0044736 | A1 * | 3/2007 | DeSantis | F24H 1/188 | 392/441 |
| 2009/0159017 | A1 * | 6/2009 | Tsuge | F24D 19/1051 | 122/14.1 |
| 2012/0285542 | A1 * | 11/2012 | Leigh | F24H 15/174 | 137/334 |
| 2013/0094840 | A1 * | 4/2013 | Seitz | F24H 1/202 | 392/449 |
| 2014/0183025 | A1 * | 7/2014 | Kamen | B01D 1/2896 | 202/185.1 |
| 2015/0166320 | A1 * | 6/2015 | Siawor | B67D 3/0061 | 222/67 |
| 2020/0333045 | A1 * | 10/2020 | Kernich | F24H 1/202 | |

OTHER PUBLICATIONS

Machine English Translation of CN-111306355-A (Year: 2020).*
Brache, U.S. Appl. No. 16/051,357, filed Jul. 31, 2018.
Brache, U.S. Appl. No. 62/605,048, filed Jul. 31, 2017.
Brache, U.S. Appl. No. 63/243,142, filed Sep. 11, 2021.

* cited by examiner

ELECTRIC COMPACT COMPOSITE WATER HEATER AND BOOSTER

PRIORITY CLAIM

This application is a continuation in part of U.S. patent application Ser. No. 16/051,357, filed on Jul. 31, 2018, which claims the benefit of U.S. Provisional Patent Application 62/605,048 filed Jul. 31, 2017; this application claims the benefit of U.S. Patent Application No. 63/243,142, filed on Sep. 11, 2021; and all cited applications are incorporated by reference in entirety.

TECHNICAL FIELD AND BACKGROUND

The present application relates to a water heater booster to save water, time, energy and compact enough to install under most sinks with faucets, connects to regular electrical outlet of 120 volts AC (alternating current) and will not corrode because the tank is made of composite material. The unit can also be used as a water heater where only cold water and electricity is available, avoiding the need to run both hot and cold water to secluded locations or in a recreational vehicle or airplane.

BACKGROUND OF THE INVENTION

Currently, water heaters are the second largest energy users in homes and buildings, and letting the water run down the drain, waiting for hot water to come out of the faucet is considered a normal day to day practice in most places. The outcome is the wasting of water, our most precious resource and wasting energy too because the water heater has already heated the water once before. When sitting in pipes, this unused hot water eventually gets cold, and the user will allow this cooled water to run down the drain to get the fresh hot water—unintentionally wasting water.

Many persons find themselves having cold water coming out of the hot side of the faucet an average of 1 to 3 minutes, and with larger homes sometimes waiting almost 5 minutes for hot water to come out of the faucet; this inefficiency lets gallons of good quality water go down the drain. This problem of wasting water is common for both homes and buildings and regardless if the water heaters are gas or electric tank heaters or even tankless water heaters. Any situation where the water heater is a distance away from the faucet causes the problems of water and energy waste, including the time spent waiting for hot water.

Where well water is the primary source of water, this water wastage can be a dilemma if the well water runs out, and a water truck has to be arranged to replenish the low water supply. In some instances, people catch the running water in containers while waiting for the hot water to arrive and then use the water for plants, pets, etc. However, when time is more critical, some people choose to let good water run down the drain because water waste is less important. Even if city water is readily available, some places have septic tanks and allowing the water to run causes the problem of having to order a sewage truck sooner to pump out the septic tank that's full, and the problem is worst during the winter months because that's when more water is wasted, waiting for the hot water to arrive.

For aviation water heaters, the biggest problems are construction and design of the water tank, which have always used stainless steel cylinders for the water tank. Stainless steel requires welding, which introduces metal fatigue into the water tank, which leads to leaks and cause structural damage to the fuselage and other components, such as antennas and electrical wiring. There is also a high rate of failure rate due to leakage and structural failures. For example, the current aviation water heaters have an average rate of failure is approximately 18 months. The inventor believes using composite materials for the water heater tank will allow the improved design for an apparatus for heating water to have at least a 24 month or longer lifespan.

BRIEF SUMMARY OF THE INVENTION

There is an improvement to an apparatus for heating water comprising:

- a power source, which connected to an electronic circuit board, and at least one heating element;
- a pressurized composite water tank, which lies within an outer housing; the pressured composite water tank can have an integral channel or groove that allows for wires from the electronic circuit board to the at least one heating element.

The pressurized composite water tank is closed with a main bottom fitting, a main bottom nut and a main bottom nut O-ring; a water outlet fitting and a housing lock plate secures an outlet elbow tube assembly in the composite water tank to allow outflow of heated water; the outlet elbow tube assembly has a first outlet elbow tube assembly end and a second outlet elbow tube assembly end; the first and the second outlet elbow tube assembly ends have different cross-sectional dimensions; the water outlet fitting has a stop flange portion, a first O-ring groove, a second O-ring groove, a first water outlet fitting O-ring and a second water outlet fitting O-ring.

The at least one heating element is located within the main bottom fitting and is detachable; the main bottom fitting can be made of a metallic material, which allows for transfer of energy from the heating element to the water in the pressurized composite water tank; a temperature sensing device, which comprises a thermistor sensor and a stainless-steel probe, is located within the pressurized composite water tank and is connected to the electronic circuit board; a thermostat; a water level sensing device within the composite water tank and is connected to the electronic circuit board; and the electronic circuit board can have LED indicating lights for showing temperature selection and status of the at least one heating element.

The main bottom nut can have multiple holes; the main bottom fitting is made of a metallic material; and the main bottom nut is made of a composite material.

PARTS LISTING

Figure 1:
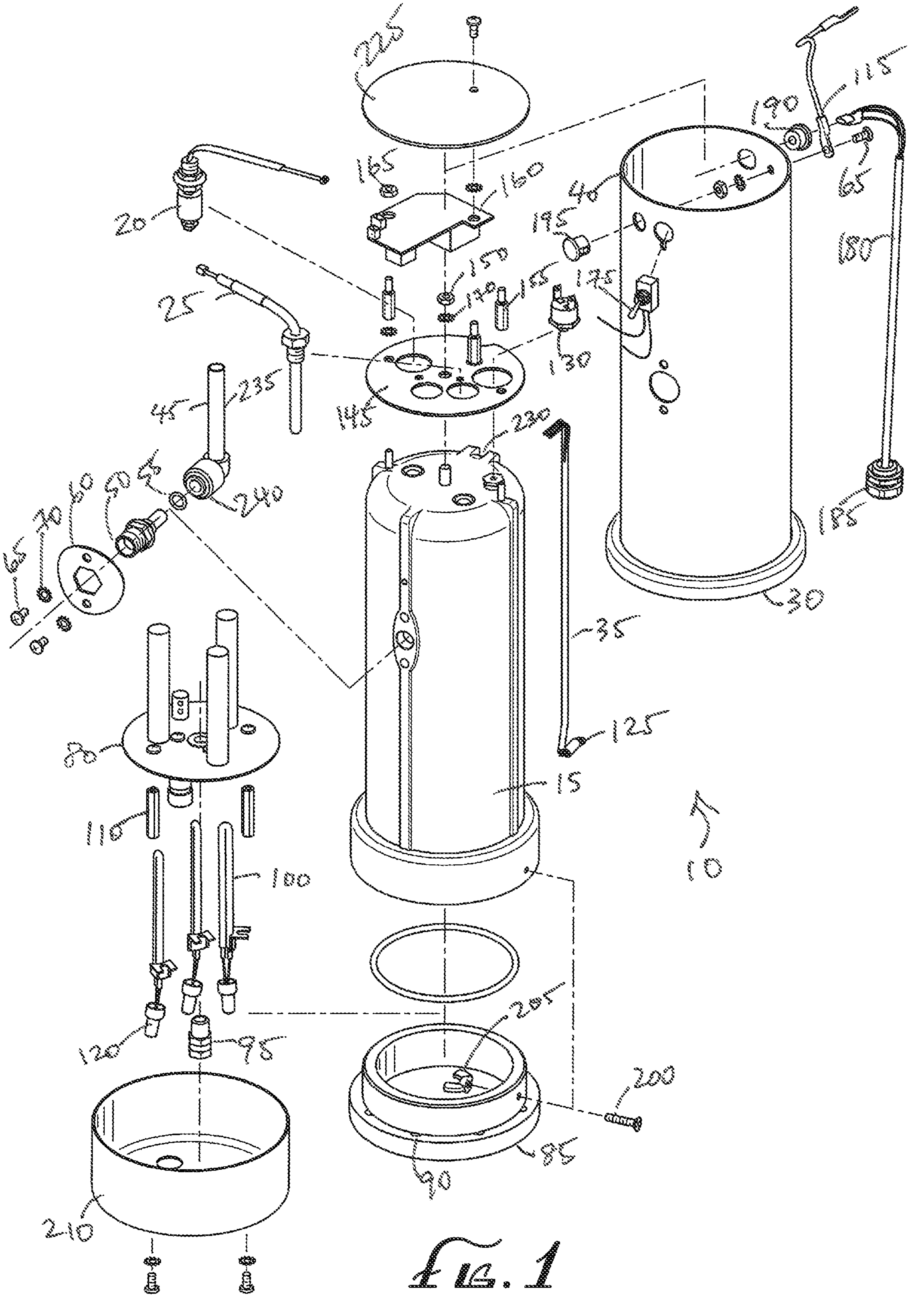
FIG. 1 is an exploded view of one preferred embodiment of the apparatus for heating water, to be used preferably in an aircraft or mobile vehicle.

10 apparatus for water heating
15 tank assembly
20 water sensor
25 probe assembly for temperature
30 top half-bottom cover
35 wire assembly, feed-through
40 tank housing
45 outlet elbow tube assembly
50 water outlet fitting
55 O-ring
60 housing lock plate
65 screw
70 washer, external star type
80 Main bottom fitting
85 Main bottom nut
90 Holes on Main bottom nut
95 relief valve
100 heater elements
105 hex head copper probe or copper hex insert (for thermostat)
110 Standoff, bottom fitting hex
115 Ground Wire
120 Splice, closed-end
125 Ring terminal
130 Thermostat, Overheat Switch
135 THERMISTOR
140 TEMP PROBE (Stainless-Steel)
145 Top Electrical Plate Assembly
150 ¼-20 Nut
155 Standoff, electrical plate hex
160 Electronic Circuit Board
165 Nut, 8-32 stainless steel type
170 Washer, external, star
175 Toggle Switch
180 Power wire assembly
185 connector assembly
190 strain relief
195 clear locking plug
200 screw, countersunk stainless-steel
205 Nut, wing (black)
210 bottom cover
225 top cover assembly
230 groove/channel on composite water tank
235 First end of the outlet elbow tube assembly
240 Second end of the outlet elbow tube assembly
245 Stop flange on water outlet fitting
250 O-Ring Groove #1
255 O-Ring Groove #2
260 O-Ring
265 O-Ring

DETAILED DESCRIPTION

Figure 2:
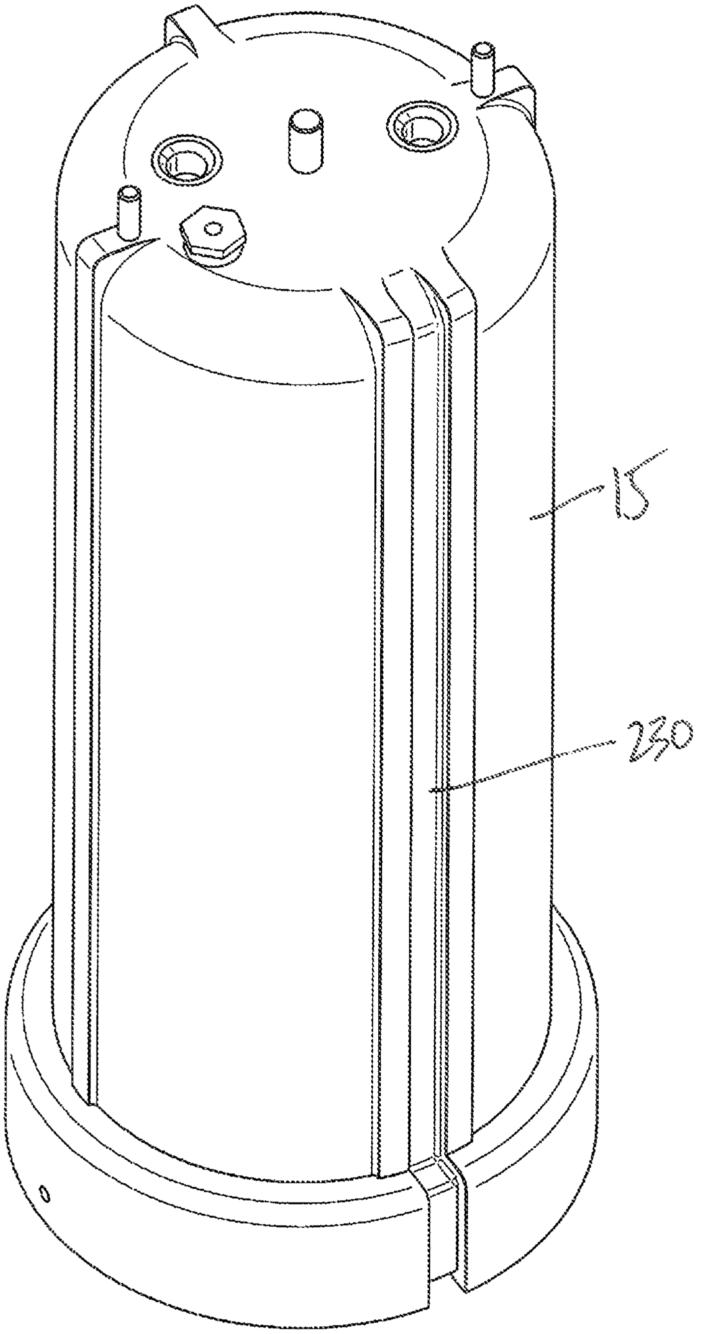
FIG. 2 is a perspective view of the water tank.
Figure 3:
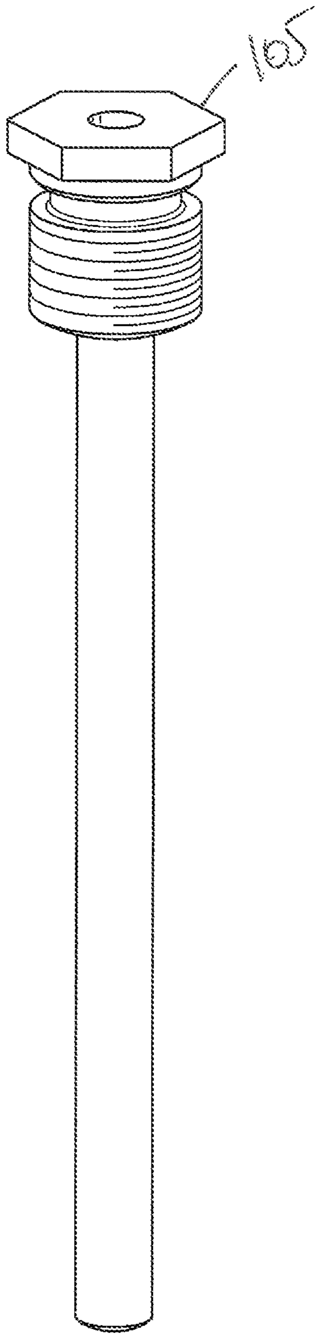
FIG. 3 is a perspective view of the copper hex insert (for thermostat)
Figure 4:
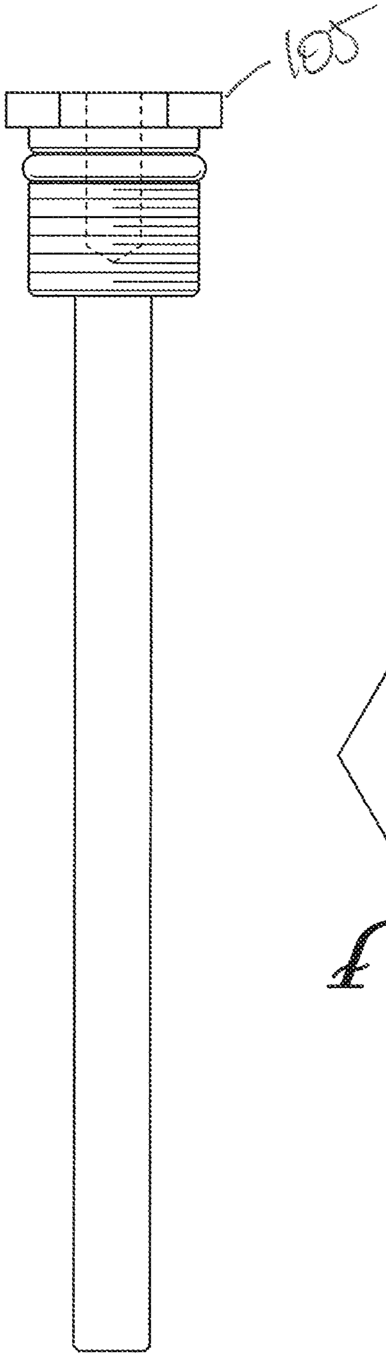
FIG. 4 is a side elevational view of the copper hex insert.
Figure 5:
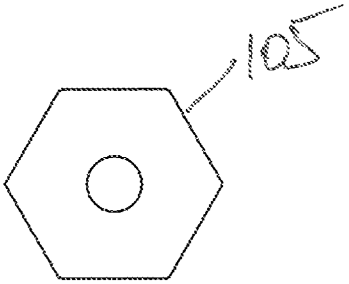
FIG. 5 is a top view of the copper hex inert.
Figures 6, 7, 8:
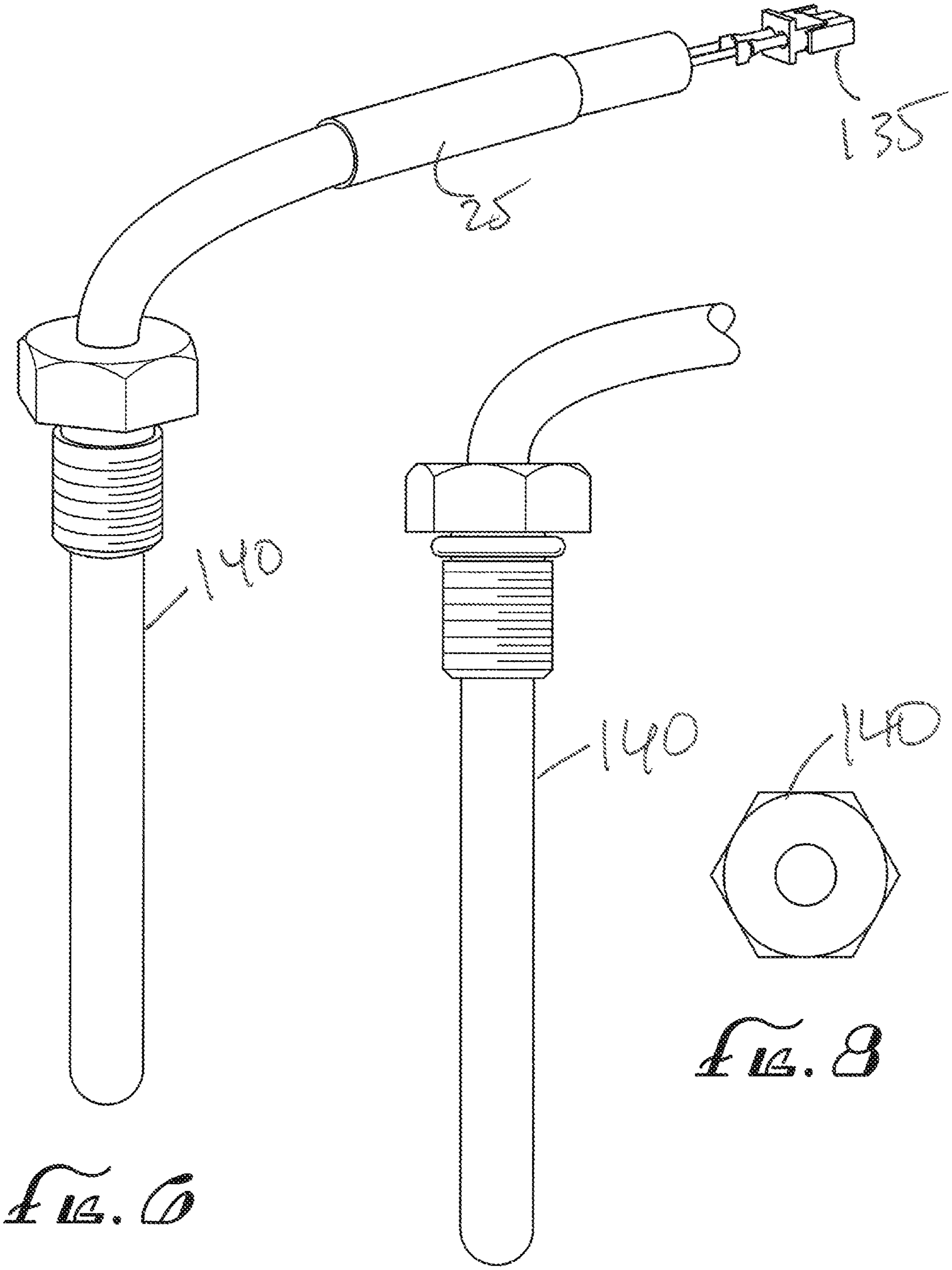
FIG. 6 is a perspective view of the Probe Assembly for Temperature.
FIG. 7 is a side elevational view of the Probe Assembly of FIG. 6.
FIG. 8 is a top view of the Probe Assembly.
Figure 9:
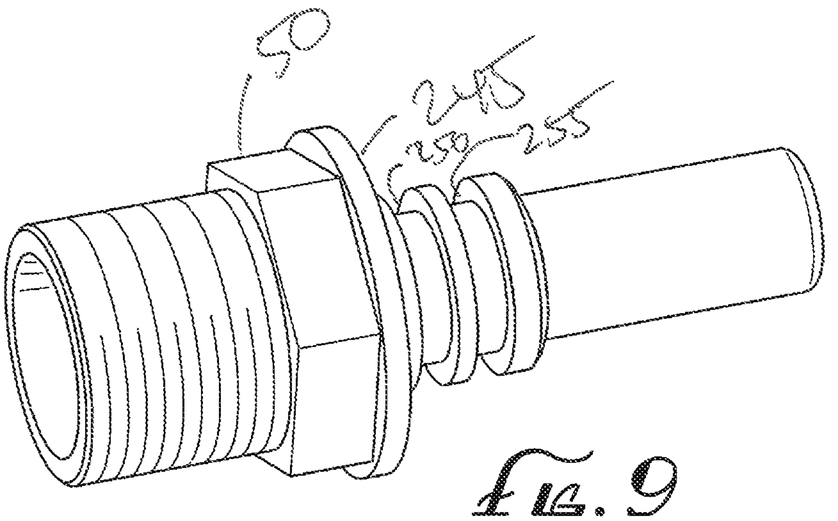
FIG. 9 is a perspective view of the Water Outlet Fitting.
Figure 10:
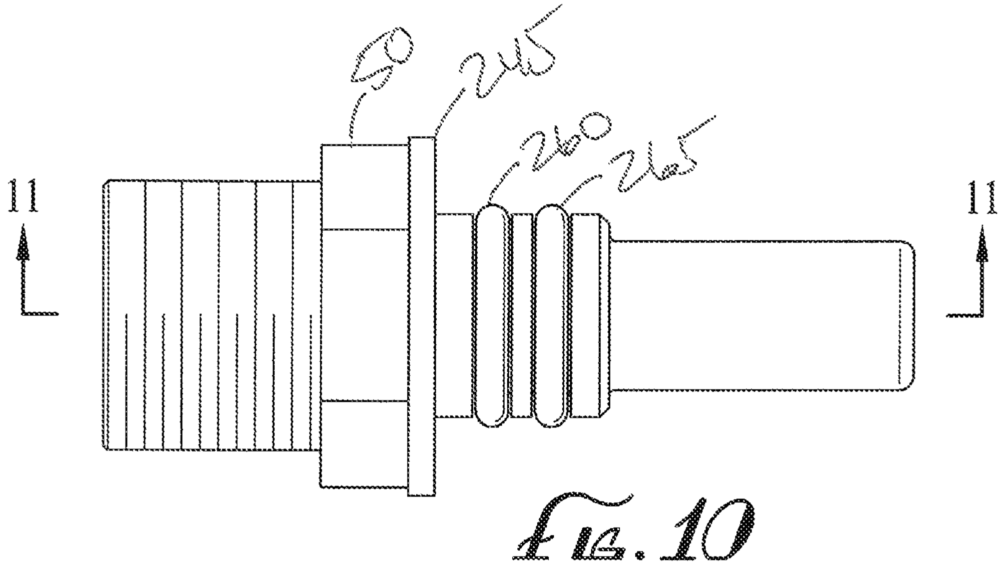
FIG. 10 is a side elevational view of the Water Outlet Fitting of FIG. 9.
Figure 11:
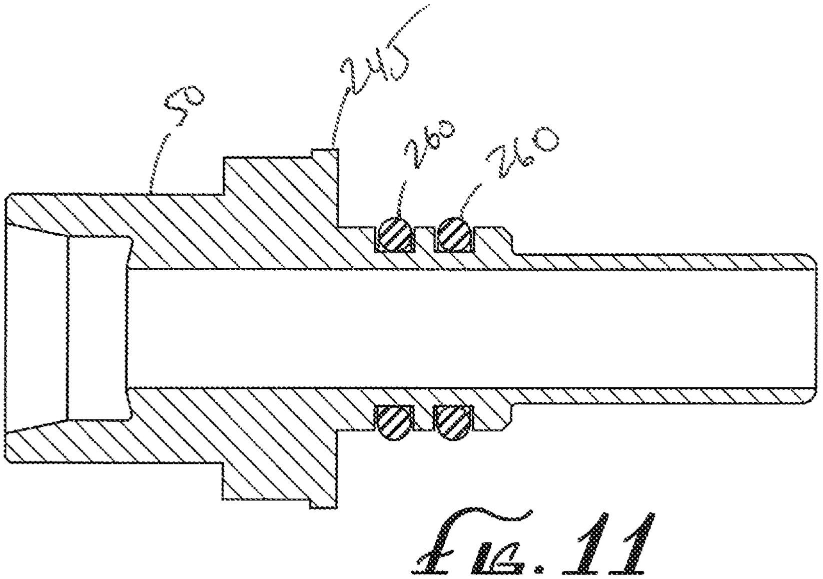
FIG. 11 is a cross-sectional view of the Water Outlet Fitting of FIG. 9.
Figure 12:
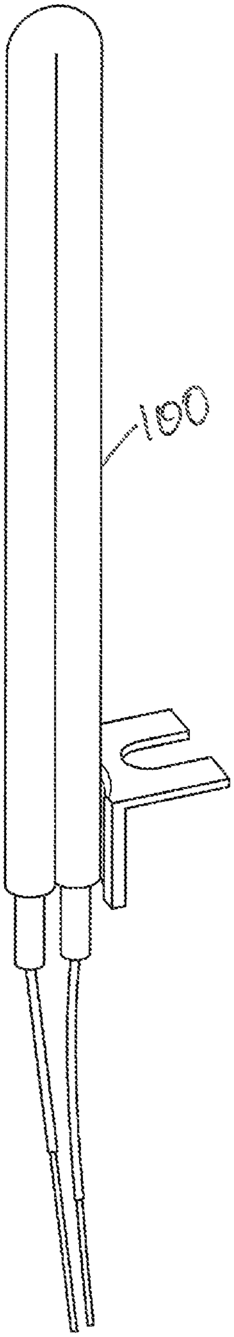
FIG. 12 is a perspective view of the Heater Element.
Figure 13:
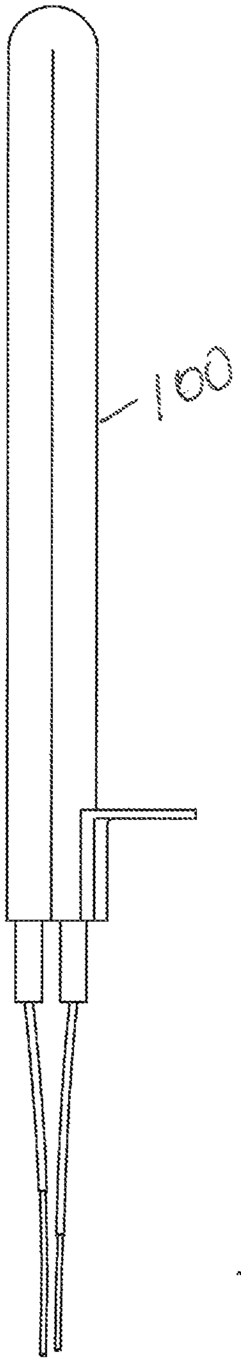
FIG. 13 is a side elevational view of the Heater Element of FIG. 12.
Figure 14:
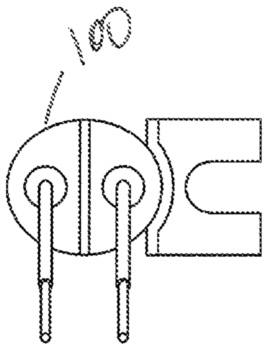
FIG. 14 is a top view of the Heater Element.
Figure 15:
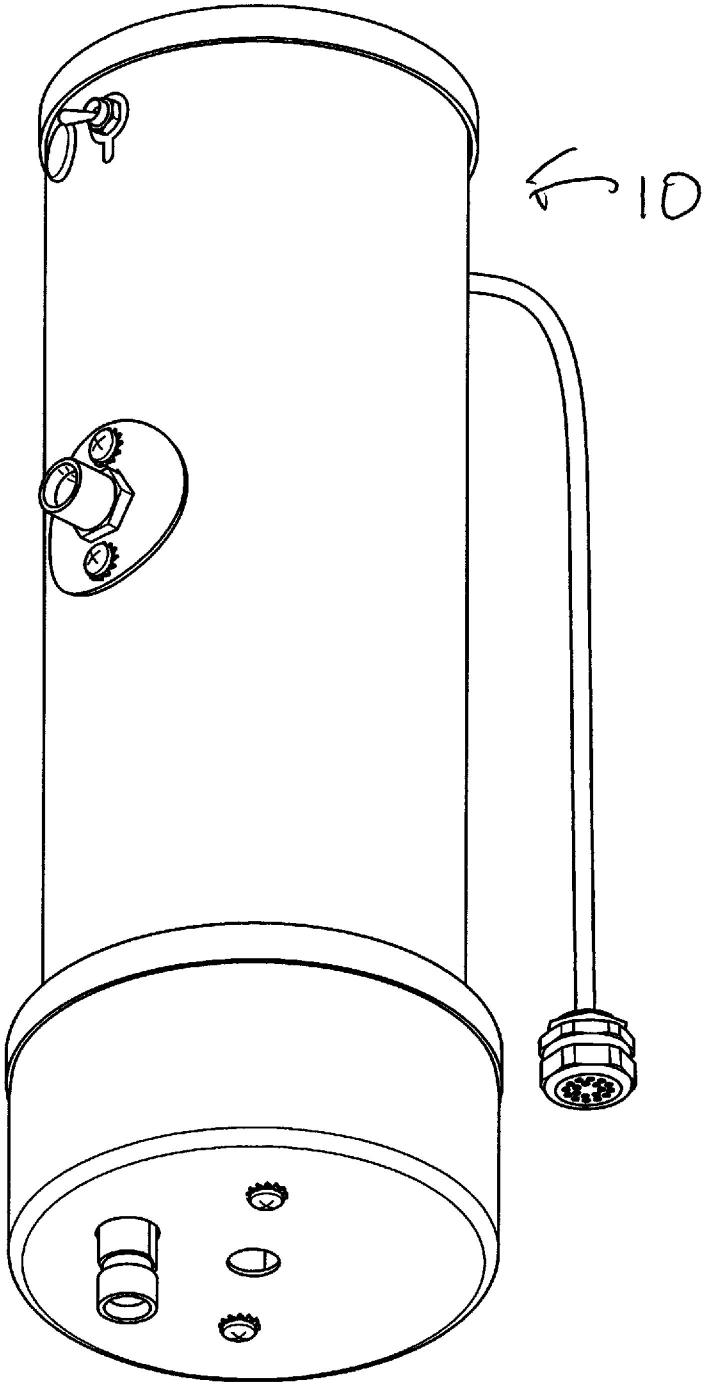
FIG. 15 is a bottom perspective view of the assembled apparatus for heating water.

As shown in FIG. 1-15, there is presented an apparatus for heating water, which can be used for airplanes, motor homes and other recreational vehicles. There is an apparatus for heating water, which comprises a power source (usually 115 to 120 volts AC), which is connected to an electronic circuit board, and at least one heating element.

There is a pressurized composite water tank, which lies within an outer housing; the pressurized composite water tank is closed with a main bottom fitting, a main bottom nut and a main bottom nut O-ring; a water outlet fitting and a housing lock plate secures an outlet elbow tube assembly in the composite water tank to allow outflow of heated water.

The outlet elbow tube assembly has a first outlet elbow tube assembly end and a second outlet elbow tube assembly end; the first and the second outlet elbow tube assembly ends have different cross-sectional dimensions; the water outlet fitting has a stop flange portion, a first O-ring groove, a second O-ring groove, a first water outlet fitting O-ring and a second water outlet fitting O-ring.

The at least one heating element is located within the main bottom fitting and is detachable; the main bottom fitting can be made of a metallic material, which allows for transfer of energy from the heating element to the water in the pressurized composite water tank.

There is also a temperature sensing device, which can preferably be a thermistor sensor and a stainless-steel probe; this temp. sensing device is located within the pressurized composite water tank and is connected to the electronic circuit board. There is also a thermostat, which can thread into the top of the hex head copper rod or insert in FIG. 3-5; this thermostat and copper rod acts as a manual fuse to interrupt electrical power from the system when the heated water gets too hot or in the event of overheating.

There is also a water level sensing device within the composite water tank and is connected to the electronic circuit board, preventing the heating elements from turning on when there is no water in the water tank.

The main bottom nut can have multiple holes, which allows for passage of the electrical wires from the top of the apparatus and top of the water tank to the alignment channel on the outside of the water tank. These holes on the main bottom nut also allow for engagement of a tightening wrench. The main bottom fitting can be made of a metallic material, and the main bottom nut is made of a composite material.

The electronic circuit board has LED indicating lights for showing temperature selection and status of the at least one heating element. The pressured composite water tank can have an integral channel that allows for wires from the electronic circuit board to the at least one heating element.

1. Heating Element:
   a. This type of heating element is designed to not "burn out" if no water in water heater;
   b. This type of heating element is designed to not be damaged in freezing environment;
   c. Removable from stainless steel Main bottom fitting even if tank is full of water;
   d. In a multiple heating element situation, and if there is a failure of one of the heating elements, but if there is at least one working heating element, the electronic circuit board is intended to allow water heater to continue functioning to desired temperature.
2. Heating Device for mobile home, recreational vehicle or aircraft (FIG. 1-15):

This type of heating device is removable from the main bottom fitting; is connected with wires to the power source and the electronic circuit board. When power is supplied to this heating unit, the bent U-shaped portion will expand and contact the inside portion of the main bottom fitting, which lies within the second end of the composite water tank and will heat the water that lies within;

At least one heating element is detachable from the pressurized composite water tank while it is full of water, so long as the electrical power to the water heater is not energized; the heating element, if connected electrically in parallel, would continue to heat water in tank until all heating elements fail from wear; the heating element is designed to function whether there is water or not in tank.

3. Temperature Sensing Device can be made of copper (hex head shaped in FIG. 3-5); this sensor is placed within the water tank to provide direct water temperature to thermostat (off the shelf-safety device).
4. Temp Sensing Device: Thermistor and Stainless-Steel Probe.
   a. Placed within the water tank to provide water temperature to circuit board via a resistance;
   b. The temp sensing device comprised of a thermistor sensor soldered to wires and attached to a connector, such that the connector provides a solid electrical contact allowing the thermistor to provide a readable resistance due to the temperature surrounding the stainless-steel probe, giving the electronic circuit board the ability to control selected temperature of outlet water.
5. Separate Thermostat (one preferred embodiment uses an off the shelf item to interrupt electrical circuit in case of overheating, including without limitation: an overheat switch thermostat, such as SELCO brand ½ inch disc thermostat); this thermostat can be connected to a copper hex probe or copper hex head insert.
6. LED lights on the circuit board are seen through openings on the Housing Body (so that you do not need bulbs outside the outer housing.
7. Water Sensing device, which lies within the composite water tank and is connected to the electronic circuit board, prevents the heating elements from turning "on" when no water is in the tank.
8. Water Outlet Fitting with multiple or two O-rings that attach to the composite water tank and seals water inside the tank.
9. Main Bottom Fitting, Main Bottom Nut and Bottom Cover on bottom or second end of the pressurized composite water tank.

Main bottom fitting is made of a metallic material, has hollow prong portions that engage the heating elements. The main bottom fitting is made of a metallic material, which allows for transfer of energy from the heating element to the water in the pressurized composite water tank. At least one heating element is located within the main bottom fitting and is detachable from the pressurized composite water tank.

The main bottom nut has multiple holes, and the main bottom nut is made of a composite material. The bottom cover can also act as a cup, even if there is some leakage within the apparatus; the leakage should collect into the bottom cover, and an optional drain can be attached to the bottom cup cover to expel any water leakage from the aircraft fuselage.

10. Pressurized composite water tank is designed to use composite materials instead of stainless-steel to prevent decomposing tanks and leaks; with the other heating components, this composite water tank functions as a water heating device; this water tank is designed to not deform due to heat from its heating element in situations with or without water in the tank; this water tank is designed to not deform due to atmospheric pressures whether positive or negative, with or without water in the tank (i.e., allowing pressurized composite water heaters to be installed above or below sea level at any altitude).

The pressurized composite water tank is closed with a main bottom fitting, a main bottom nut and a main bottom nut O-ring; the pressured composite water tank has an integral channel that allows for wires from the electronic circuit board to the at least one heating element.

As shown in the provisional patent application drawings (See Provisional Drawing Pages 10 and 11), there is a stem molded into the inner top of the composite water tank; since the outlet of the water tank is generally on the side of the tank and approximately half-way between the top and bottom of the water tank, this stem helps align the outlet elbow tube assembly so that the tank will completely fill before releasing water out of the outlet; this stem guide will help make sure that when the tank is being filled, it will fill the tank from nearly the top of the tank and not from the bottom (where the inlet is located).

11. Electronic circuit board with temperature selections and LED indicating lights; these temperature selections and/or selectors allows the user to easily select and change the temperature; these LED indicating lights allow the user to easily and visually see status of the heating device.

These LED indicating lights allow the user to easily and visually troubleshoot the reason for lack of heating or overheating of device; the electronic circuit board has LED indicating lights for showing temperature selection and status of the at least one heating element.

A water level sensing device within the composite water tank and is connected to the electronic circuit board; this water level sensor helps prevent the heating elements from turning "On" when no water is in the tank.

12. Power source is typically Alternating Current (AC) electricity and supplies the electrical power for heating the elements through the electronic circuit board; this power source's incoming electrical is regulated at the electronic circuit board to sense water level and temperature, ultimately controlling the electrical power the heating element, such that the desired temperature of the water flows from the outlet fitting.

This heating device can also be adapted for other aircraft that use different wattage, such AIRBUS (70 watts) or BOEING airplanes (140 watts, but with a different connector). For recreational vehicles, a power generator can also be used for the power.

13. Water saving restrictor tubing:

Said water saving restrictor prevents the user from excess water flow, allowing the water to be heated sufficient for use whereby said water saving device provides immediate hot water.

14. Water outlet fitting and a housing lock plate secures an outlet elbow tube assembly in the composite water tank to allow outflow of heated water.
    a. the water outlet fitting has a stop flange portion, multiple O-ring grooves and multiple matching O-rings;
    b. other embodiments have the water outlet fitting with a first O-ring groove, a second O-ring groove, a first water outlet fitting O-ring and a second water outlet fitting O-ring.

In the related U.S. Patent Application (Ser. No. 16/051,357, filed on Jul. 31, 2018), there is shown processes of making another embodiment of the invention in Figures P1, P2 and P3, showing P1 as Phase 1, the making of a watertight tank assembly, P2 is for Phase 2, the making of an operational leak check present invention, and P3 is for Phase 3, the final assembly, testing and completing the present invention.

The use of the present invention will save quality water from going down the drain in various locations mentioned previously, especially during the colder days when most users of hot water allow the water to run until the hot water finally comes out of the faucet. This is a common practice in residences, businesses and places having hot and cold running water.

The use of the present invention will save time for most users in the various locations since the time to get hot water out of the faucet is greatly reduced to seconds instead of minutes. Saving time will occur and vary depending on the location, weather during time of year which affects water temperature, and the distance the main water heater is to faucet where the present invention is installed.

The use of the present invention will save energy because the immediate hot water coming out of the faucet will reduce the amount of water that is normally allowed to run down the drain, and therefore reduce the energy used by conventional water heaters, whether gas or electric large capacity and including tankless water heaters.

The use of the present invention will save space in various locations mentioned previously, encouraging most users to install the present invention because it will not take the majority of space in the cabinet like some water heaters do. The space saving feature along with the ability to connect directly into common 120 volts AC electrical outlets and not requiring additional electrical expenses, will incentivize the use of the present invention, and saving money will ultimately motive the consumers to install the present invention, with the end result of saving millions of gallons of good quality water from going to waste.

The present invention will be the most water saving device when installed in kitchens and bathrooms, furthest from the main water heater, and connected between the hot water shut-off valve and the "hot" water line at the faucet. When the hot water is selected at the faucet, the normally cold water that's been sitting in the pipes enters the present invention, and the hot water stored in the tank immediately provides the hot water to the user.

The use of the present invention will also save energy in that the water temperature is maintained at about 115-120 degrees F., just below the temperature of the common water heaters, providing immediate hot water when needed but turning its heater "off" when not in use, or when the present invention senses the hot water has finally arrived from the main water heater ("Sleepmode Technology").

The invention is unique in that the heating element with gasket, gets installed directly into the bottom assembly made of high temperature plastic material, Nylon 6 of the present invention, to properly seal the tank while able to heat the water as designed.

The invention is unique in that the combination of high temperature composite material used for the bottom assembly along with the composite tank makes the present invention more durable, lasting longer because the tank will not corrode. And when simple to change components fail, like the heating element, then there will also be less waste going into the landfill along with the garbage.

The present invention is easy to install for most users in that the plastic inlet and outlet tubing is quickly connected with Push-to-Connect fittings that adapt into the hot water shut-off valve, and once the tank is full of water, the user simply inserts the electrical power cord into a standard electrical outlet.

The present invention is a point of use water heater in that it is installed under a sink, connects to a regular outlet and makes cold water hot. However, its size and way of use is very different because the invention gets installed between the hot water shut-off valve and the hot water line going up to the faucet. When the faucet is opened for the hot water, the invention provides immediate hot water (approximately 120 degrees F.) and automatically shuts the heater off when not in use, or when the water heater booster senses the hot water has arrived from the main water heater. "Sleepmode Technology" is the name for this design.

One of the objectives of the invention is to save water, especially when the water heater booster is installed at the faucet furthest from the main water heater, whether it be the kitchen sink or a bathroom. However, most kitchens with garbage disposals and or dishwashers already have the electrical outlets below the sink, making the installation of the water heater booster easier and less costly to install.

Another benefit of the invention is saving time by providing users hot water within seconds since they do not have to wait approximately 1 to 5 minutes for hot water to come out of the faucet; because the original design for the water heater was for an aircraft, being energy efficient was required. Testing the water heater booster for power consumption (kilowatts) in a kitchen with two adults over the course of 3 months, then calculated (estimated) for wattage use over a year, estimated the invention to be about the same power consumption as two 75-watt light bulbs.

In order to be flexible for various applications, the invention can use different wattage cartridge heaters with 1500 watts being the standard for most residential, commercial and industrial applications, and the 500-watt model used for the transport industry such as recreational vehicles, boats, semi-tractor trailers, trains, buses, etc.

Although the invention will not take the place of a main water heater providing a continuous hot water supply, the invention can be used as a point-of-use water heater in places that need hot water. So long as a cold-water supply line is available with 120 volts AC electrical, the invention can be used as a water heater providing hot water for locations such as backyard barbeques, pool houses, outdoor restrooms, etc.

This heating device can also be adapted for other aircraft that use different wattage, such AIRBUS (70 watts) or BOEING airplanes (140 watts, but with a different connector).

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Further, the title, headings, terms and phrases used herein are not intended to limit the subject matter or scope; but rather, to provide an understandable description of the invention. The invention is composed of several sub-parts that serve a portion of the total functionality of the invention independently and contribute to system level functionality when combined with other parts of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Any element in a claim that does not explicitly state "means for" performing a specific function, or "step for" performing a specific function, is not be interpreted as a "means" or "step" clause as specified in 35 U.S.C. Sec. 112, Paragraph 6. In particular, the use of "step of" in the claims herein is not intended to invoke the provisions of 35 U.S.C. Sec. 112, Paragraph 6.

As used, the term "water heater" is used to refer to explain one of the functions, but this is only one of the features used to describe the present invention, wherein cold water gets heated to a regulated hotter temperature and available to be mixed with cold water for use in various locations, such as kitchens and bathrooms in residential, commercial and industrial applications, mobile locations requiring hot and cold water, such as the transportation industry, and in isolated locations where only cold water and electricity is available. It is understood by those of ordinary skill in the art that some uses may be omitted or added and still fall within the spirit of the invention.

Incorporation by Reference: All publications, patents, and patent applications mentioned in this specification are herein incorporated by reference to the same extent as if each individual publication, patent, or patent application was specifically and individually indicated to be incorporated by reference: U.S. Pat. Nos. 10,875,649; 9,688,407; 10,443,859; 4,257,355; 4,330,309.

I claim:

1. An apparatus for heating water comprising:

a power source connected to an electronic circuit board and at least one heating element;

a pressurized composite water tank, which lies within an outer housing;

wherein the pressurized composite water tank is closed with a main bottom fitting, a main bottom nut and a main bottom nut O-ring;

a water outlet fitting and a housing lock plate secured to an outlet elbow tube assembly in the composite water tank to allow outflow of heated water;

the outlet elbow tube assembly comprising a first outlet elbow tube assembly end and a second outlet elbow tube assembly end;

the first and the second outlet elbow tube assembly ends comprising different cross-sectional dimensions;

the water outlet fitting comprising a stop flange portion, a first O-ring groove, a second O-ring groove, a first water outlet fitting O-ring and a second water outlet fitting O-ring;

wherein the at least one heating element is located within the main bottom fitting and is detachable;

the main bottom fitting is made of a metallic material, which allows for transfer of energy from the heating element to the water in the pressurized composite water tank;

a temperature sensing device, which comprises a thermistor sensor and a stainless-steel probe, wherein the temperature sensing device is located within the pressurized composite water tank and is connected to the electronic circuit board;

a thermostat; and a water level sensing device within the composite water tank that is connected to the electronic circuit board.

2. The apparatus of claim 1, wherein the main bottom nut comprises multiple holes; the main bottom fitting is made of the metallic material, and the main bottom nut is made of a composite material.

3. The apparatus of claim 1, wherein the electronic circuit board comprises LED indicating lights for showing temperature selection and status of the at least one heating element.

4. The apparatus of claim 1, wherein the pressured composite water tank comprises an integral channel that allows for wires from the electronic circuit board to the at least one heating element.

5. An apparatus for heating water comprising:

a power source connected to an electronic circuit board and at least one heating element;

a pressurized composite water tank, which lies within an outer housing;

wherein the pressurized composite water tank is closed with a main bottom fitting, a main bottom nut and a main bottom nut O-ring;

a water outlet fitting and a housing lock plate secured to an outlet elbow tube assembly in the composite water tank to allow outflow of heated water;

the water outlet fitting comprising a stop flange portion, multiple O-ring grooves and multiple matching O-rings;

a first temperature sensing device, which comprises a thermistor sensor and a stainless-steel probe, wherein the first temperature sensing device is located within the pressurized composite water tank and is connected to the electronic circuit board;

a second temperature sensing device; and a water level sensing device within the pressurized composite water tank that is connected to the electronic circuit board.

6. The apparatus of claim 5, wherein the pressured composite water tank comprises an integral channel that allows for wires from the electronic circuit board to the at least one heating element.

7. The apparatus of claim 5, wherein the outlet elbow tube assembly comprises a first outlet elbow tube assembly end and a second outlet elbow tube assembly end; and the first and the second outlet elbow tube assembly ends having different cross-sectional dimensions.

8. The apparatus of claim 5, wherein the electronic circuit board comprises LED indicating lights for showing temperature selection and status of the at least one heating element.

9. The apparatus of claim 5, wherein the water outlet fitting comprises a first O-ring groove, a second O-ring groove, a first water outlet fitting O-ring and a second water outlet fitting O-ring.

10. The apparatus of claim 5, wherein said at least one heating element is located within the main bottom fitting and is detachable from the pressurized composite water tank.

11. The apparatus of claim 5, wherein the main bottom nut comprises multiple holes; the main bottom fitting is made of a metallic material, and the main bottom nut is made of a composite material.

12. The apparatus of claim 5, wherein the second temperature sensing device is a thermostat.

13. The apparatus of claim 5, wherein the main bottom fitting is made of a metallic material, which allows for transfer of energy from the heating element to the water in the pressurized composite water tank.

14. An apparatus for heating water comprising:

a power source connected to an electronic circuit board and at least one heating element;

a pressurized composite water tank, which lies within an outer housing;

the pressured composite water tank having an integral channel that allows for wires from the electronic circuit board to the at least one heating element;

wherein the pressurized composite water tank is closed with a main bottom fitting, a main bottom nut and a main bottom nut O-ring;

a water outlet fitting and a housing lock plate secured to an outlet elbow tube assembly in the composite water tank to allow outflow of heated water;

the outlet elbow tube assembly comprising a first outlet elbow tube assembly end and a second outlet elbow tube assembly end;

the first and the second outlet elbow tube assembly ends comprising different cross-sectional dimensions;

the water outlet fitting comprising a stop flange portion, a first O-ring groove, a second O-ring groove, a first water outlet fitting O-ring and a second water outlet fitting O-ring;

wherein the at least one heating element is located within the main bottom fitting and is detachable;

wherein the main bottom fitting is made of a metallic material, which allows for transfer of energy from the heating element to the water in the pressurized composite water tank;

a temperature sensing device, which comprises a thermistor sensor and a stainless-steel probe, wherein the temperature sensing device is located within the pressurized composite water tank and is connected to the electronic circuit board;

a thermostat;

a water level sensing device within the composite water tank that is connected to the electronic circuit board; and the electronic circuit board has LED indicating lights for showing temperature selection and status of the at least one heating element.

15. The apparatus of claim 14, wherein the main bottom nut comprises multiple holes; and the main bottom nut is made of a composite material.

16. The apparatus of claim 14, wherein the thermostat is connected to a hex copper probe.

* * * * *